US009407303B2

(12) United States Patent
Menon et al.

(10) Patent No.: US 9,407,303 B2
(45) Date of Patent: Aug. 2, 2016

(54) TECHNIQUE FOR GENERATING A FILTER FOR DATA RECEPTION

(71) Applicant: Telefonaktiebolaget L M Ericsson (publ), Stockholm (SE)

(72) Inventors: Deepak Menon, Bangalore (IN); Ravi Jandial, Bangalore (IN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/384,149

(22) PCT Filed: Mar. 12, 2013

(86) PCT No.: PCT/EP2013/055040
§ 371 (c)(1),
(2) Date: Sep. 9, 2014

(87) PCT Pub. No.: WO2013/135723
PCT Pub. Date: Sep. 19, 2013

(65) Prior Publication Data
US 2015/0023443 A1 Jan. 22, 2015

Related U.S. Application Data

(60) Provisional application No. 61/616,102, filed on Mar. 27, 2012.

(30) Foreign Application Priority Data

Mar. 14, 2012 (EP) ..................................... 12001751

(51) Int. Cl.
*H04B 7/02* (2006.01)
*H04L 1/02* (2006.01)
(Continued)

(52) U.S. Cl.
CPC .................. *H04B 1/123* (2013.01); *H04B 7/08* (2013.01); *H04L 25/03993* (2013.01); *H04L 25/0242* (2013.01)

(58) Field of Classification Search
CPC ...... H04B 1/123; H04B 7/08; H04L 25/0242; H04L 25/03993
USPC ......................................................... 375/267
See application file for complete search history.

(56) References Cited

U.S. PATENT DOCUMENTS 7,289,583 B2 10/2007 He
2001/0033614 A1 10/2001 Hudson
(Continued)

FOREIGN PATENT DOCUMENTS

WO 2006/136875 A1 12/2006

OTHER PUBLICATIONS

Alexander, P.D.; Rasmussen, L.K.; "An efficient technique for deriving receiver filters in multiuser asynchronous DS/SSMA," 5th IEEE International Symposium on Personal, Indoor and Mobile Radio Communications, 1994. Wireless Networks—Catching the Mobile Future., 1994, pp. 519-523 vol. 2.*
(Continued)

*Primary Examiner* — Nader Bolourchi
(74) *Attorney, Agent, or Firm* — Leffler Intellectual Property Law, PLLC

(57) ABSTRACT

A technique for generating a processing filter is provided. The processing filter allows for processing data that is received in a mobile communication network on multiple branches. A method embodiment of the technique includes the steps of determining a covariance of noise on the multiple branches and computing the processing filter based on the noise covariance. The computation includes a Cholesky decomposition of the noise covariance and a matrix inversion based on a result of the Cholesky decomposition, wherein the Cholesky decomposition uses a first numerical representation and the matrix inversion uses a second numerical representation that is more complex than the first numerical representation.

20 Claims, 9 Drawing Sheets

(51) Int. Cl.
H04B 1/12 (2006.01)
H04L 25/03 (2006.01)
H04B 7/08 (2006.01)
H04L 25/02 (2006.01)

(56) References Cited

U.S. PATENT DOCUMENTS

2006/0235919 A1* 10/2006 Lee et al. ............ 708/426
2010/0136940 A1* 6/2010 Hui et al. ............ 455/307

OTHER PUBLICATIONS

PCT International Search Report, mailed Apr. 10, 2013, in connection with International Application No. PCT/EP2013/055040, all pages.
PCT Written Opinion, mailed Apr. 10, 2013, in connection with International Application No. PCT/EP2013/055040, all pages.
Frantz, Gene et al. "Comparing Fixed-and Floating-Point DSPs", 2004, XP002681652. Retrieved from the Internet: URL:http://www.ti.com/lit/wp/spry061/spry061.pdf [retrieved on Aug. 10, 2012], pp. 1-8.
Steeves, P.A. "Block Cholesky Algorithms" Geodetic Software Systems. Downloaded from the Internet prior to Mar. 12, 2013, pp. 1-6.
Happonen, A. et al. "GSM channel estimator using a fixed-point matrix inversion algorithm" International Symposium on Signals, Circuits and Systems, 2005, vol. 1, pp. 119-122.
Happonen, A. et al. "A Reconfigurable Processing Element Implementation for Matrix Inversion Using Cholesky Decomposition" World Academy of Science, Engineering and Technology, Mar. 2005, pp. 114-117.
Happonen, A. et al. "A Reconfigurable Processing Element for Cholesky Decomposition and Matrix Inversion" World Academy of Science, Engineering and Technology, Mar. 2005, pp. 523-528.
Texas Instruments "TI's new TMS320C66x fixed- and floating-point DSP core conquers the 'Need for Speed' White Paper" Document No. SPRY147, Nov. 2010, Texas Instruments, Dallas, Texas, USA. Retrieved from the Internet on or before Nov. 21, 2012. URL: www.ti.com/lit/wp/spry147/spry147.pdf, pp. 1-7.
European Examination Report, mailed Aug. 14, 2015, in connection with European Application No. 12 001 751.2, all pages.
Ake Bjorck et al., "Method for Large Scale Total Least Squares Problems", SIAM Journal on Matrix Analysis and Applications—22(2), shows paged numbered as 413-429 (pp. 1-17), Jul. 31, 2006.

* cited by examiner

TECHNIQUE FOR GENERATING A FILTER FOR DATA RECEPTION

CROSS-REFERENCE TO RELATED APPLICATIONS

This application claims priority under 35 U.S.C. §119 to European Patent Application No. 12001751.2, filed Mar. 14, 2012, which is hereby incorporated herein by reference in its entirety. This application also claims the benefit of U.S. Provisional Application No. 61/616,102, filed Mar. 27, 2012, which is hereby incorporated herein by reference in its entirety.

TECHNICAL FIELD

The present disclosure relates to a filter for data reception. Particularly, the disclosure relates to a method and a device for generating such a filter in the context of a mobile communication network. As a matter of terminology and not limitation, such a filter is also referred to as a "whitening" filter in some areas of technology.

BACKGROUND

The increasing spread of mobile communication has led to a steady evolution of communication technology, including the Global System for Mobile Communications (GSM), its evolution EDGE, the Universal Mobile Telecommunications System (UMTS) and the Long Term Evolution (LTE), which are also referred to as different generations of mobile cellular technology. There is also progress in the implementation within existing generations of mobile cellular technology such GSM. On a worldwide perspective, the GSM network is still the most popular cellular mobile communication system having billions of subscribers, which success often leads to shortage in network capacity.

Network capacity may generally be increased using closely spaced cells to serve the increasing number of mobile devices. However, closely spaced cells increase co-channel interference. Network operators prefer reusing their allocated frequency spectrum and existing infrastructure, which is why Single Antenna Interference Cancellation (SAIC) and Downlink Advance Receiver Performance (DARP-I) have been implemented on the side of the mobile devices in order to maximize the reuse of the twelve frequencies available for a base station in GSM networks. Such improvements avoid additional antennas, and mitigate the co-channel interference and adjacent channel interference for mobile devices in GSM and Enhanced Data Rate for GSM Evolution (EDGE) networks.

Another improvement compatible with both existing GSM networks and existing mobile devices is the so-called Voice Services over Adaptive Multi-User Orthogonal Sub-Channels (VAMOS), which pairs two mobile devices on the same channel. However, this pairing further increases the interference level and thus requires a better interference mitigation capability of the GSM receiver. Network capacity can also be limited by interference in any other mobile communication generation, including LTE.

WO 2006/136875 A1 describes a filter for "whitening" noise, which is referred to as Spatio-Temporal Interference Rejection Combining (ST-IRC), to suppress interference and noise during synchronization and channel estimation in GSM and EDGE networks. According to ST-IRC, the receiver "whitens" the noise spatially and temporally by means of a "whitening" filter. The "colored" interference or noise is "whitened" across spatial and temporal branches leading to improved receiver performance.

The whitening filter has to be generated individually depending on the current correlation of the noise across the received branches. This requires a so-called inverse Cholesky decomposition, as outlined in what follows.

Denoting the amplitudes of the "colored" noise on the multiple branches by $u_1, \ldots$, the colored noise is collectively referred to using a vector $U=(u_1, \ldots)^T$. The colored noise U is a stochastic vector. Denoting the expectation value, i.e., the "averaging", of the stochastic process by E, a noise covariance matrix of the colored noise U is $$\Lambda = E[UU^H].$$

The whitening filter is a linear transformation, F, that yields "whitened" noise W when applied to the "colored" noise U, as symbolized by $$W = FU.$$

"White" noise means that the transformed signal including the "white" noise W has a noise covariance that is equal to the identity matrix (up to an over-all normalization factor):

$$E[WW^H] = E[FU(FU)^H] = I,$$

wherein the matrix F representing the "whitening" filter is deterministic, so that it can be factored out of the expectation value resulting in $$F\Lambda F^H = I. \tag{1}$$

Since the noise covariance matrix $\Lambda$ is by definition a Hermitian and positive-definite matrix, it can be subject to a Cholesky factorization, $$\Lambda = LL^H,$$

wherein the lower triangular matrix of the Cholesky decomposition is denoted by $L=\text{Chol}(\Lambda)$. One solution for the filter F in Eq. (1) is given by:

$$F = L^{-1} = [\text{Chol}(\Lambda)]^{-1}. \tag{2}$$

The generation of the filter F thus requires the computation of an inverse Cholesky decomposition. As a consequence of realistic channel profiles, including those specified by the 3rd Generation Partnership Project (3GPP), the covariance matrix $\Lambda$, based on which the filter F is computed, is often ill-conditioned. The covariance matrix sometimes comes close to singular or even yields technically meaningless results. This leads to a significant degradation of the receiver performance, e.g., when the generation of the filter is implemented on a fixed-point processor. Ill-conditioned matrices particularly occur in the so-called block Cholesky decomposition, which is frequently implemented in existing receivers and described in the review article "Block Cholesky Algorithms" by P. A. Steeves, Geodetic Software Systems.

SUMMARY

Accordingly, there is a need for a technique that reliably generates a filter that improves data reception at least under certain conditions and preferably with as little computational complexity as possible.

According to one aspect, a method of generating a processing filter for processing data received in a mobile communication network on multiple branches is provided. The method comprises the steps of determining a covariance of noise on the multiple branches; and computing the processing filter based on the noise covariance, wherein the computation includes a Cholesky decomposition of the noise covariance and a matrix inversion based on a result of the Cholesky decomposition, wherein the Cholesky decomposition uses a first numerical representation and the matrix inversion uses a second numerical representation that is more complex than the first numerical representation.

The processing filter for processing the data may also be referred to simply filter and/or as a whitening filter.

The covariance may encompass a correlation of the noise on the multiple branches. The noise covariance may indicate at least one of a correlation of the noise on the multiple branches and a variance of the noise on each of the multiple branches. The processing filter may be configured to de-correlate the correlation of the noise on the multiple branches and/or to equalize the variance of the noise.

By way of example, the processing filter may allow pre-processing or processing the received data such that an equalizer, symbol detector or any other Multiple Input-Single Output (MISO) unit can further process the filtered data. Due to the pre-processing or processing, the data reception can be significantly improved in at least some embodiments, e.g., in terms of a Frame Error Rate (FER). The same or some other embodiments may provide the benefit of low numerical or computational complexity and/or compatibility to an exiting equalizer, symbol detector or any other Multiple Input-Single Output (MISO) unit. An improvement may be brought about, in at least some of the embodiments, due to an equalizer, symbol detector or any other Multiple Input-Single Output (MISO) unit assuming or requiring that the noise on the multiple branches is uncorrelated, whereas the noise on the multiple branches might be correlated in some realistic situations.

The noise may encompass interference or any other form of external perturbation of the received data. For example, a communication may be subject to interference due to one or more interfering network components not part of the communication. The interfering network component may transmit on the same frequency, sub-carrier or channel used by the communication, or on a neighboring frequency, sub-carrier or channel. The interfering network component may be a base station or a mobile device. The data may be received over a wireless transmission. The method may be performed by or for a receiver. The receiver may be the receiver of a base station and/or a mobile device, or any other receiving network component.

The noise as received across the multiple branches may be colored noise. The noise may be correlated between the multiple branches and/or the noise level may be unequal on the multiple branches. The unequal noise level may be indicated by unequal diagonal elements or eigenvalues of the noise covariance. For example, the diagonal elements or eigenvalues of the noise covariance may differ from another by more than 10% or by at least a factor of 2. The presence of colored noise on the multiple branches may be indicated by the noise covariance matrix not being a multiple of the identity (or the identity matrix). The processing filter may whiten the noise ("whitening" filter).

At least one of the noise covariance, the mixing filter and the scaling filter may be represented by a matrix. The correlation may be indicated by off-diagonal elements of the covariance matrix. The variances may be indicated by diagonal elements of the covariance matrix. Alternatively or in addition, the scaling filter may be represented by a vector (e.g., $(d_1, \ldots )^T$), and/or a diagonal matrix (e.g., $D=\text{diag}(d_1, \ldots )$). Any one or all of the matrices may have dimensions N×N. N may denote a number of the multiple branches. Elements of the mixing filter and/or the scaling filter may be computed, e.g., iteratively. The processing filter and/or the mixing filter may be represented or representable by means of a triangular matrix. The term "triangular matrix" may relate to a matrix representation, wherein all matrix elements on one side of the matrix diagonal are at least essentially zero.

The first numerical representation may include a mantissa and an exponent. According to the first numerical representation, a real part and an imaginary part of a complex value may include one exponent common for both the real part and the imaginary part. The exponent may be the same for both the real part and the imaginary part of the same complex value. The exponent of the real part and the exponent of the imaginary part of the same complex value may be encoded in the same physical memory cell. Each of the real part and the imaginary part of the same complex value may have a separate mantissa. For numerically representing a matrix including a plurality of matrix elements, there may be one exponent for each complex matrix element. There may be two mantissas for each complex matrix element.

The second numerical representation may include a mantissa and an exponent. According to the second numerical representation, a real part and an imaginary part of a complex value may include an exponent different for each of the real part and the imaginary part. The exponents may be different for the real part and the imaginary part of the same complex value. Each of the real part and the imaginary part of the same complex value may have a separate mantissa. For numerically representing a matrix including a plurality of matrix elements, there may be two exponents for each complex matrix element. One of the two exponents may relate to a real part of the complex matrix element and another one of the two exponents may relate to an imaginary part of the same complex matrix element. There may be two mantissas for each complex matrix element.

The processing filter may include a mixing filter adapted to mix signals received on different branches of the multiple branches. The mixing filter may be configured to compensate, suppress or eliminate a correlation between the noise on the multiple branches. The compensation of the correlation of the noise may also be referred to as a de-correlation of the noise. The mixing filter may be configured to de-correlate the noise on the multiple branches. The de-correlation may substantially suppress or essentially eliminate the correlation of the noise.

The processing filter may include a scaling filter adapted to scale individual signals. The scaling filter may be different and/or separate from the mixing filter. The scaling filter need not mix different components. The mixing filter and the scaling filter can be computed for applying the scaling filter before applying the mixing filter. Alternatively, the filters can be computed for applying the scaling filter after applying the mixing filter. Individual signals resulting from the mixed signals may be scaled.

The scaling filter may be configured to equalize a variance of the noise. The variance of the noise may indicate a noise level. The noise variance of the mixed components may be equalized. A de-correlated and equalized noise may also be referred to as white noise.

The data may be received on different branches of the multiple branches separate in at least one of space and time. The correlation of the noise on the multiple branches may be a correlation in at least one of space and time. The noise covariance may indicate the correlation of the noise between the multiple branches. The multiple branches may represent a temporal and/or spatial diversity. The processing filter may be computed according to a Spatio-Temporal Interference Rejection Combining (ST-IRC).

The data may be redundantly received on each or some of the multiple branches. The data may be oversampled on each or some of the multiple branches. The method may further comprise the step of sampling signals of the data received on the multiple branches, wherein the noise covariance is determined based on the sampled signals. The signals received on the multiple branches may include signals received on different receive antennas. Alternatively or in addition, the signals received on the multiple branches may include adjacent temporal samples. The received signals may be sampled at a sampling rate that is higher than a baud rate of the data transmitted in the mobile communication network. The sampling rate may be twice the baud rate. Alternatively or in addition, the signals received on the multiple branches may include an in-phase component (e.g., I) and a phase-shifted component (e.g., a pi/2-shifted component Q) of each temporal sample.

The computation may involve a first procedure. The Cholesky decomposition may be computed by means of the first procedure. The first procedure may relate to both the computation of the mixing filter and the computation of the scaling filter. The computation of the scaling filter can be completed by the first procedure. The computation of the mixing filter may remain incomplete after the first procedure. A result of the first procedure may be an intermediate result for the computation of the mixing filter. Intermediate results of the first procedure may include individual matrix elements. The first procedure may store and/or process variables and/or intermediate results according to the first numerical representation.

The first procedure may relate to the computation of the mixing filter based on a lower triangular matrix, R, according to $$R_{(i,j)} = \wedge(i,j) - \sum_{k=0}^{j-1} \frac{R_{(i,k)} R^*_{(j,k)}}{d_k} \text{ for } i > j.$$

Alternatively or in addition, the first procedure may relate to the computation of the scaling filter according to $$d_i = \wedge(i,j) - \sum_{k=0}^{i-1} \frac{R_{(i,k)} R^*_{(i,k)}}{d_k} \text{ for } i = j.$$

The scaling filter may be represented by a diagonal matrix, e.g., D=diag($d_1$, ...), or by a vector, e.g., d=($d_1$, ...)$^T$.

The computation of the mixing filter may include the matrix inversion of the lower triangular matrix. The lower triangular matrix may be inverted in a second procedure according to $$Y_{(i,j)} = \begin{cases} 0, & i < j \\ I_{(i,j)} - \sum_{k=0}^{i-1} \frac{R_{(i,k)} Y_{(k,j)}}{d_k}, & i \geq j \end{cases}$$

wherein I is the identity matrix.

The computation of the mixing filter can be completed by the second procedure. The mixing filter, Y, may be related to the lower triangular matrix, R, according to Y=D·R$^{-1}$. The second procedure may store and/or process variables and/or intermediate results according to the second numerical representation.

The processing filter may be applied to the received data in a sequence of operations in accordance with at least one of $$F = D^{1/2} \cdot R^{-1}, \text{ wherein the lower triangular matrix may be denoted by } R; \text{ and}$$

$$F = D^{-1/2} \cdot Y, \text{ wherein the mixing filter may be denoted by } Y,$$

wherein the processing filter may be represented by F and the scaling filter may be represented by a diagonal matrix D.

The method may further comprise the step of pre-processing signals of the received data according to the mixing filter. The method may further comprise the step of scaling the pre-processed signals (e.g., $S_Y$) according to the scaling filter. Alternatively or in addition, the method may comprise the step of processing the signals of the received data according to the processing filter. The mixing filter may be applied first to the received data. Individual components of the mixed components may be scaled.

The method may further comprise the step of providing the scaling filter to one or more units that process the pre-processed signals. The mixing filter and the scaling filter may be separately output and/or applied. The mixing filter need not be provided to a module provided with the pre-processed signals or processed signals. The scaling filter may be propagated to modules after applying the mixing filter. The scaling filter may be provided based on square roots, e.g., in the form of D$^{-1/2}$=diag(1/sqrt($d_1$), ...).

The method may further comprise the step of determining a channel estimate. The channel estimate may be transformed into a pre-processed channel estimate using the mixing filter, or into a processed channel estimate using the processing filter. The transformation of the channel estimate may be in accordance with H'=Y·H, wherein the mixing filter may be represented by Y and the channel estimate may be represented by H. The transformation of the channel estimate may be in accordance with H"=F·H, wherein the processing filter may be represented by F and the channel estimate may be represented by H.

The method may further comprise the step of assessing a condition of the noise covariance. At least a part of the computation may be performed in response to the assessment indicating an ill-conditioned covariance. The computation and/or the application of one or more of the processing filter, the mixing filter and the scaling filter may depend on the assessment indicating an ill-conditioned covariance. The assessment may include the first procedure. The ill-conditioned covariance may be indicated by one or more negative or essentially zero components of the scaling filter. Alternatively or in addition, one or more eigenvalues close to zero (within machine precision) or even negative may indicate the ill-conditioned covariance.

The generation of the processing filter may be triggered by the presence or dominance of "colored" noise. The processing filter may be computed and/or applied only in the presence or dominance of "colored" noise. The processing filter may be continuously generated or updated. The generation of the processing filter may be interrupted or changed in the presence or dominance of "white" noise on the multiple branches. The presence or dominance of "white" noise may be indicated by at least essentially equal diagonal elements (e.g., including a variance) of the noise covariance and/or off-diagonal elements (e.g., including a correlation) of the noise covariance that are at least essentially zero or small compared to the variances. The computation of the processing filter may be changed by reducing the complexity of the computation or of the numerical representation. For example, the computation of the processing filter may be changed by using the first numerical representation for both the Cholesky decomposition and the matrix inversion.

The ill-conditioned covariance may be indicated by zero or negative diagonal elements in the Cholesky decomposition. Alternatively or in addition, a determinant of the noise covariance may be computed based on the Cholesky decomposition. The ill-conditioned covariance may be indicated by the presence of negative diagonal elements in the Cholesky decomposition.

The method may further comprise the step of synchronizing the data reception, e.g., relative to a GSM burst. The determinant of the noise covariance may be computed as part of the synchronization. A minimal determinant may indicate the temporal position of the burst synchronization.

According to another aspect, a method of numerically computing an inverse Cholesky decomposition is provided. The method comprises the steps of determining a Cholesky decomposition of an input matrix, wherein the Cholesky decomposition includes a plurality of first elements and a numerical representation of each first element uses a common exponent for both a real part and an imaginary part of the respective first element; and computing an inverse based on a result of the Cholesky decomposition, wherein the inverse includes a plurality of second elements and a numerical representation of each second element uses a first exponent for a real part of the respective second element and a different second exponent for an imaginary part of the respective second element.

According to another aspect, a computer program product is provided. The computer program product comprises program code portions for performing one or more of above steps when the computer program product is executed by a computing device. The computer program product may be stored on a computer-readable recording medium. The computer program product may be provided for download in a computer network, such as the Internet. A component of the network may provide a fragment of the computer program product.

According to a still further aspect, a device for generating a filter for processing data received in a mobile communication network on multiple branches is provided. The device comprises a determining unit adapted to determine a covariance of noise on the multiple branches; and a computing unit adapted to compute the processing filter based on the noise covariance, wherein the computation includes a Cholesky decomposition of the noise covariance and a matrix inversion based on a result of the Cholesky decomposition, wherein the Cholesky decomposition uses a first numerical representation and the matrix inversion uses a second numerical representation that is more complex than the first numerical representation.

The determining unit may be included in a unit for synchronization and/or channel estimation. The channel estimating unit may be adapted to estimate the channel state (e.g., H). The computing unit may separately output the mixing filter and/or the scaling filter. The determining unit and the computing unit may be identical.

The device may further comprise a pre-processing unit adapted to pre-process signals of the received data according to a mixing filter included in the processing filter. Alternatively or in addition, the device may comprise an equalizing unit adapted to scale the pre-processed signals according to a scaling filter included in the processing filter.

The device may further be adapted to, or comprise units adapted to, perform one or more of the steps disclosed above in the context of the method aspect. The device may further comprise any feature disclosed above in the context of the method aspect.

BRIEF DESCRIPTION OF THE DRAWINGS

Further features, effects and advantages of the invention are described in more detail below for the purpose of explanation and not limitation by exemplary embodiments with reference to the drawings, wherein.

DETAILED DESCRIPTION

In the following description of preferred embodiments, for purposes of explanation, specific details are set forth, such as particular configurations, sequences of steps and numerical representations, in order to provide a thorough understanding of the present disclosure. It will be apparent to one skilled in the art that the technique presented herein may be practiced in other embodiments that depart from these specific details. For example, while the embodiments will primarily be described in the context of the GSM mobile communication standard, it will be evident that the technique presented herein can also be practiced in connection with third and fourth generation mobile communication systems according, for example, to the UMTS and LTE standards.

Moreover, those skilled in the art will appreciate that components, units, services, functions and steps explained herein below will be implemented using software functioning in conjunction with the programmed microprocessor, an Application Specific Integrated Circuit (ASIC), a Digital Signal Processor (DSP) or a general purpose computer. It will also be appreciated that while the following embodiments will primarily be described in the context of methods and devices, the present disclosure may also be embodied in a computer program product as well as in a system comprising a computer processor and a memory coupled to the processor, wherein the memory is encoded with one or more programs that are configured to perform the components, units, services, functions and steps disclosed herein.

Figure 1:
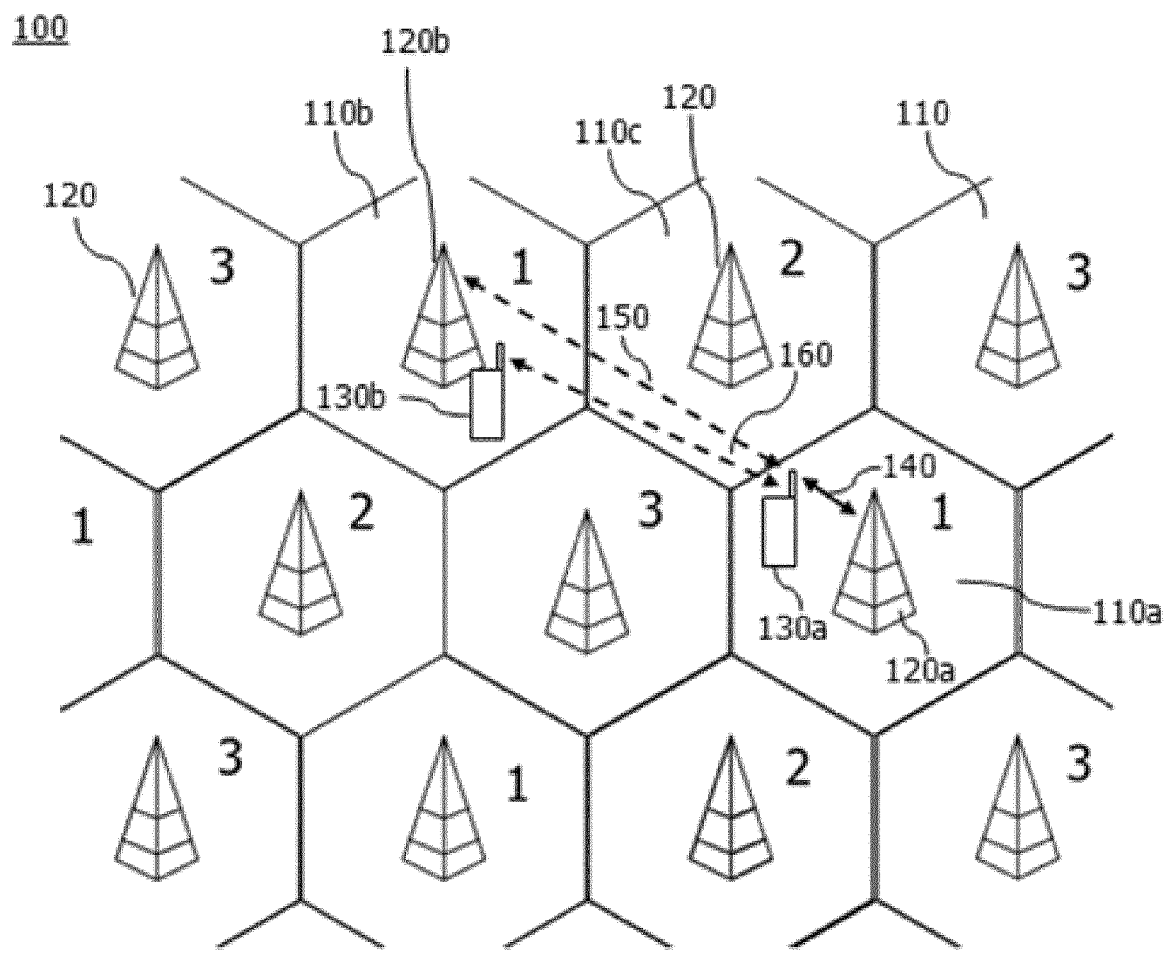
FIG. 1 schematically illustrates a cellular structure of a mobile communication network.

FIG. 1 schematically illustrates a cellular structure of a mobile communication network 100 in which the present disclosure can be practiced. The mobile communication network 100 comprises a plurality of cells collectively referred to by the reference sign 110, a plurality of base stations collectively referred to by the reference sign 120 and a plurality of mobile communication devices collectively referred to by the reference sign 130. At least one of the base stations 120 is associated with each of the cells 110. Merely for the purpose of illustration, the base stations 120 are illustrated as being located within the respective cells 110. In an alternative arrangement, at least some of the base stations 120 are arranged on the edges or vertices of the cells 110.

The mobile communication devices 130 are each associated with (at least) one of the cells 110. For example, the mobile communication device 130a is in wireless communication with the base station 120a of the cell 110a. The wireless communication may imply an at least occasional transmission of data 140. Acoustic data of a phone call or Internet application data are examples of the data 140.

Each of the cells 110 uses a certain carrier frequency for receiving and/or transmitting the data 140 from a respective (e.g., associated) one of the base stations 120 to a respective (e.g., wirelessly connected) one of the mobile communication devices 130, and vice versa. The mobile communication network 110 employs a limited number of carrier frequencies. In the example of the mobile communication network 100 shown in FIG. 1, K=3 different carrier frequencies are used as indicated by the numbers 1, 2 and 3 in association with each of the cells 110 in FIG. 1. The carrier frequencies of adjacent cells 110 are different in order not to interfere. The different carrier frequencies also allow for a controlled hand-over, in case the mobile communication device 130a moves from its currently associated cell 110a to an adjacent cell 110c. Since the number K of available carrier frequencies is limited, the cellular structure of the mobile communication network 100 aims as reusing the available carrier frequencies. In the example of the mobile communication network 100 shown in FIG. 1, a reuse factor 1/K=⅓ is high. In other words, the number K of required carrier frequencies for the mobile communication network 100 in its entirety is low.

As the number or area density of mobile communication devices 130 increases, the sizes of the cells 110 have to be reduced. Such a reduction in cell size is typically necessary in order to provide simultaneous services to the increasing number of active mobile communication devices 130. As a consequence, network components such as the mobile communication devices 130a and 130b and the base stations 120a and 120b, which transmit and/or receive on the same carrier frequency, are less distanced to each other. For example, both of the cells 110a and 110b employ the same carrier frequency $f_1$, such that the mobile communication device 130a is subject to a first interference or noise 150 caused by the base station 120b of the cell 110b and/or a second interference or noise 160 caused by the mobile communication device 130b associated with the cell 110b. In addition, the network components 120a and/or 130a can be subject to interference or noise on a neighboring carrier frequency. The neighboring carrier frequency can be a carrier frequency used in the adjacent cell 100c of the mobile communication network 100 or a carrier frequency used by another mobile communication network. While the interferences 150 and 160 are shown in FIG. 1 as acting on the mobile device 130a, alternatively or in addition, the base station 120a is subject to the same or similar sources of interference. Such sources of interference are collectively referred to as noise in the reception of the data 140. The noise is eliminated or mitigated by means of a degree of redundancy in receiving the data 140 transmitted in the communication. Generally, receiver diversity can be achieved by sampling different versions of a received signal representing the data 140.

Figure 2A:
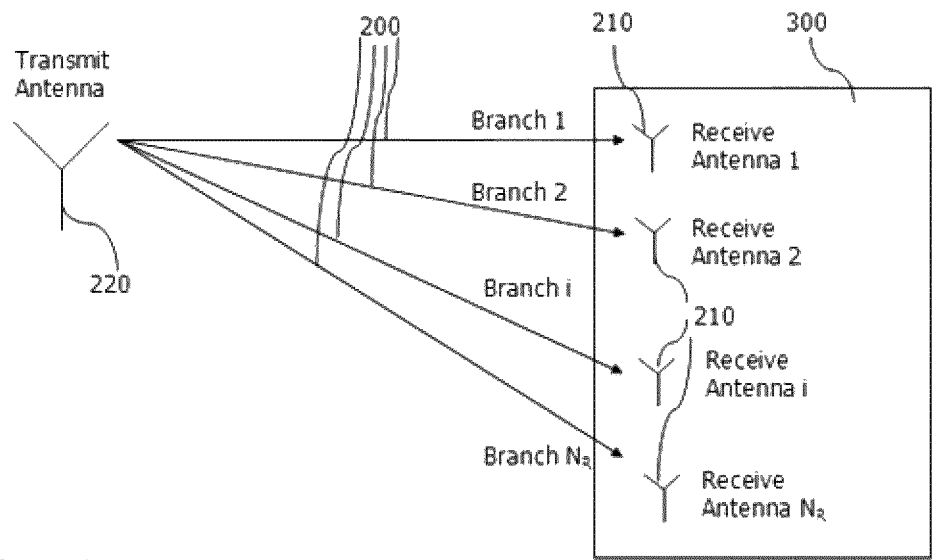
FIG. 2A schematically illustrates a spatial diversity of branches, on which data is received in the mobile communication network shown in FIG. 1.
Figure 2B:
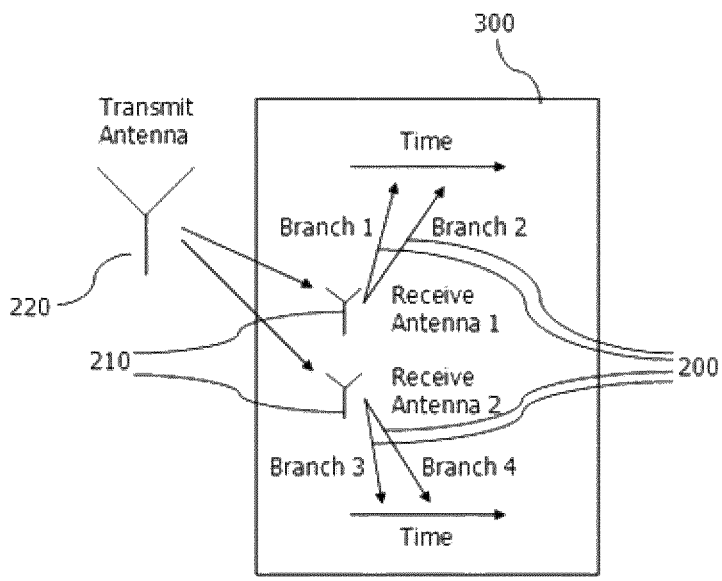
FIG. 2B schematically illustrates a spatio-temporal diversity of branches, on which data is received in the mobile communication network shown in FIG. 1.

FIGS. 2A and 2B show exemplary branches 200, which provide for the degree of redundancy. In the example of FIG. 2A, a receiver 300 includes a plurality of $N_R$ receive antennas 210. A transmit antenna 220 transmits the data 140. The data 140 is essentially simultaneously received on each of the receive antennas 210. In accordance with the spatial arrangement of the receive antennas 210, the data 140 is received via the different spatial branches 200. In other words, the branches 200 provide a degree of a spatial diversity in the example of FIG. 2A.

FIG. 2B shows a second example of multiple branches 200. The data 140 is transmitted by the transmit antenna 220. Two receive antennas 210 provide a degree of spatial diversity. In addition, the signal received on each of the receive antennas 210 is over-sampled. In other words, the received signals are sampled in time at a high rate than a data transmission rate. Temporarily adjacent samples provide for a degree of temporal diversity. Over-sampling the data 140 received at each of the $N_R$ receive antennas by a factor of $N_o$ provides $N_O \cdot N_R$ spatio-temporal branches.

Other means for receiver diversity include phase diversity, which is combinable with any of the branches 200 described above with reference to the FIGS. 2A and 2B. For phase diversity, different versions of the signal representing the data 140 are sampled including an in-phase signal I and a quadrature-phase signal Q. In a further example, the branches 200 represent a combination of spatial, temporal and/or phase diversity.

Figure 3:
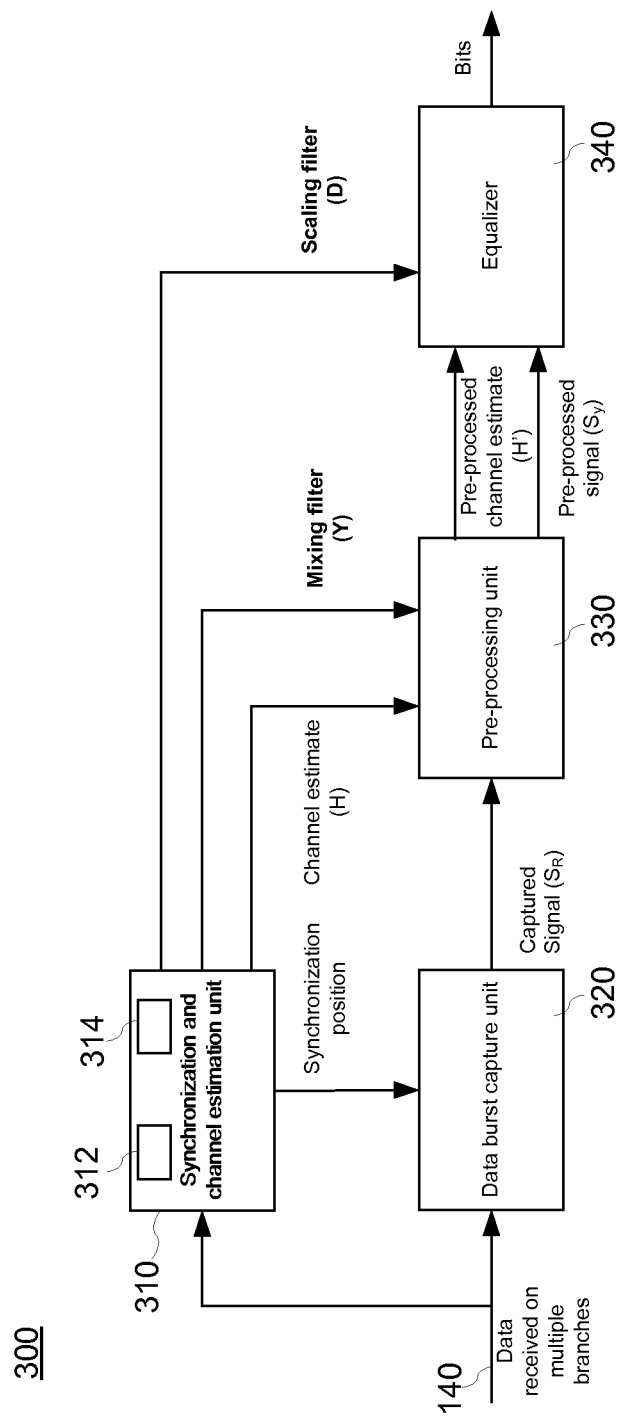
FIG. 3 schematically illustrates a block diagram of a receiver embodiment that can be implemented in any mobile or stationary network component of the mobile communication network shown in FIG. 1.

FIG. 3 schematically illustrates a block diagram of an embodiment of the receiver 300. The receiver 300 comprises one or more receive antennas 210, a synchronization and channel estimation unit 310, a data burst capture unit 320, a pre-processing unit 330 and an equalizer 340. The receiver 300 receives the data 140 on the multiple branches 200 or by any other means of receiver diversity. The receiver 300 outputs a single stream of bits representing the demodulated data 140.

In the receiver 300 schematically illustrated in FIG. 3, the synchronization and channel estimation unit 310 is a device embodiment for generating a processing filter, referred to as whitening filter hereinafter, F for processing the data 140. The synchronization and channel estimation unit 310 comprises a determining unit 312 and a computing unit 314. The determining unit 312 is adapted to determine a covariance $\Lambda$ of noise on the multiple branches 200. The computing unit 314 is adapted to compute the whitening filter F based on the noise covariance $\Lambda$. The whitening filter F includes a mixing filter Y and a scaling filter D. The computing unit 314 outputs the mixing filter Y and the scaling filter D separately. The mixing filter Y is provided to the pre-processing unit 330. The scaling filter D is provided to the equalizer 340. The synchronization and channel estimation unit 310 further provides a channel estimate H to pre-processing unit 330.

The determining unit 312 estimates the current noise covariance $\Lambda$ between the multiple branches 400 based on the data 140 received on the multiple branches 200. The computing unit 314 computes a Cholesky decomposition of the noise covariance $\Lambda$. Based on the Cholesky decomposition, a determinant of the noise covariance is computed. The determinant functions as a metric for synchronization. A synchronization position is determined by the minimal determinant. The determined synchronization position is signaled to the data burst capture unit 320. The data burst capture unit captures signals $S_R$ representing the different versions of the data 140 on the multiple branches 200.

Integrating the means for generating the whitening filter F into the synchronization and channel estimation unit 310 may, in at least some embodiments, allow synergistically using results of the synchronization, the channel estimation and the whitening filter computation. For example, the synchronization or the channel estimation may also rely on the determinant of noise covariance. Furthermore, the determinant of the noise covariance used for the synchronization may be efficiently computed as a byproduct of the Cholesky decomposition computed by the computing unit 314. In an alternative embodiment of the receiver 300, the determining unit 312 and the computing unit 314 are included in a dedicated device 310 for generating a whitening filter for processing data received in a mobile communication network on multiple branches.

The pre-processing unit 330 receives the captured signal versions $S_R$ according to the multiple branches 200 and applies the mixing filter Y in accordance with:

$$S_Y = Y \cdot S_R.$$

The pre-processing unit 330 further applies the mixing filter Y to the channel estimate H in accordance with:

$$H' = Y \cdot H.$$

The pre-processing unit 330 outputs the pre-processed channel estimate H' and pre-processed signal $S_Y$ to the equalizer 340.

Generally, the equalizer or any other multiple-input module (e.g., those modules receiving the multiple versions of the signals according to the multiple branches 200) is provided with the pre-processed signal $S_Y$ and the scaling filter D. Such a dual propagation of the pre-processed signal $S_Y$ and the scaling factor D prevents error accumulation by introducing a potential inaccuracy in the computation of the scaling factors of the scaling filter D at a later stage of the signal processing chain, thereby improving receiver performance.

Figure 4:
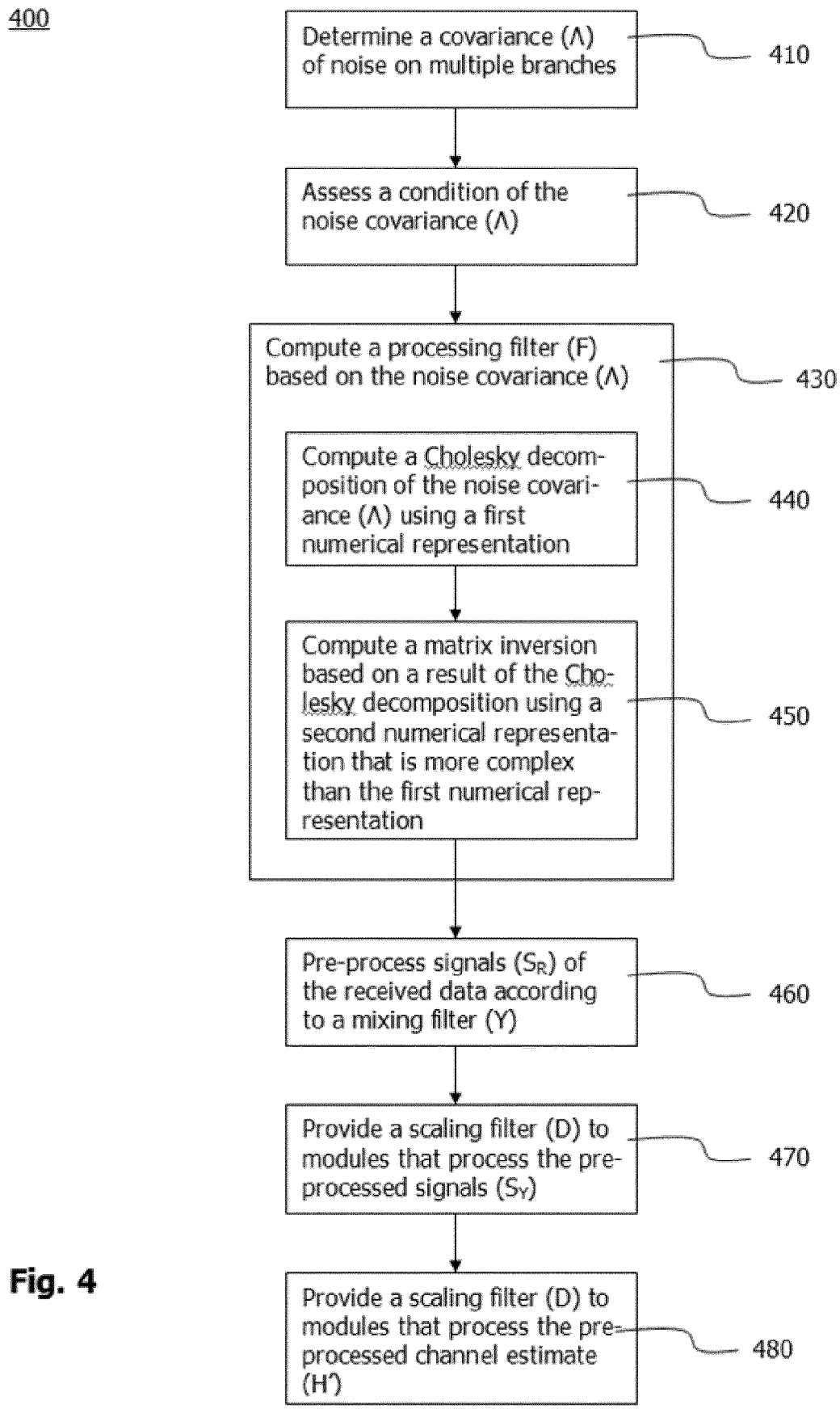
FIG. 4 shows a flow chart of a method embodiment of generating a filter for processing the data received in the mobile communication network shown in FIG. 1.

FIG. 4 shows a flow chart of an embodiment of a method 400 of generating a whitening filter for processing data received in a mobile communication network on multiple branches. The method 400 can be used to generate the whitening filter F for processing the data 140 received in the mobile communication network 100 on the multiple branches 200 described above. The method 400 comprises a step 410 of determining a covariance $\Lambda$ of noise on the multiple branches 200. The step 410 can be performed by the determining unit 312. The method 400 further comprises a step 420 of assessing a condition of the noise covariance $\Lambda$. The assessment indicates whether the noise covariance $\Lambda$ is ill-conditioned or numerically robust.

In the case of a robust noise covariance $\Lambda$, a conventional computation of the whitening filter F and/or a computation with reduced complexity (e.g., compared to a computation disclosed herein) may be employed for computing the whitening filter F. For example, only a combined whitening filter F is computed and applied in the case of the robust noise covariance $\Lambda$. Only the combined whitening filter F is output by the synchronization and channel estimation unit 310. The document WO 2006/136875 A1 describes an example of the less complex computation of the combined whitening filter F.

In the case of the ill-conditioned noise covariance $\Lambda$, a step 430 of computing the whitening filter F based on the noise covariance $\Lambda$ is performed. The step 430 includes a first step 440 of computing a Cholesky decomposition and a second step 450 of computing a matrix inversion. The Cholesky decomposition is computed according to the step 440 using a first numerical representation. The matrix inversion is computed according to the step 450 using a second numerical representation that is more complex than the first numerical representation. The step 440 decomposes the noise covariance $\Lambda$. The step 450 inverts the result of the Cholesky decomposition using the second numerical representation that is more detailed than the first numerical representation used for the Cholesky decomposition. The step 430 of computing the inverse Cholesky decomposition can be performed by the computing unit 314.

In a step 460, signals $S_R$ of the received data 140 and channel estimate H produced by the synchronization and channel estimation 310 are pre-processed by applying a mixing filter Y included in the whitening filter F. The step 460 can be performed by the pre-processing unit 330.

A scaling filter D as part of the whitening filter F is provided to some or all modules that process the pre-processed signals $S_Y$ and/or the pre-processed channel estimate H' according to a step 470. The step 470 can be performed by the computation unit 314, the synchronization and channel estimation unit 310 or the dedicated device 310 for generating the filter F.

An exemplary implementation of the step 440 of computing the Cholesky decomposition of the noise covariance $\Lambda$ is described in more detail below with reference to FIG. 5. Any other implementation of the Cholesky decomposition is also compatible with the method 400 outlined above with reference to FIG. 4. The Cholesky decomposition is beneficially implemented by means of a first procedure. Two examples of the first procedure are described in what follows by means of first and second method embodiments.

Generally, the term Cholesky decomposition relates to factorizing a positive definite matrix $\Lambda$. An exemplary decomposition is of the form $$\Lambda = LL^H,$$

wherein the superscript index H denotes the Hermitian conjugate. In the first embodiment of the method 400, the step 440 includes a conventional LDL-Cholesky decomposition. I.e., the noise covariance matrix $\Lambda$ is decomposed in a lower triangular matrix $L_{ldl}$ and a diagonal matrix D representing the scaling filter. The noise covariance matrix $\Lambda$ is decomposed according to:

$$\Lambda = L_{ldl} D L^H_{ldl}.$$

The LDL-Cholesky decomposition is unique if all diagonal elements of the scaling filter D are positive. It is also acceptable if one or more diagonal elements of the scaling filter D are equal to zero. Negative diagonal elements, however, indicate an ill-conditioned covariance matrix $\Lambda$.

Accordingly, the Cholesky decomposition matrix L is symbolically related to the lower triangular matrix $L_{ldl}$ of the LDL-Cholesky decomposition according to:

$$L = L_{ldl} D^{1/2}, \qquad (3)$$

wherein $$D_{(i,j)} = \begin{cases} d_j, & i = j \\ 0, & i \neq j \end{cases}$$

is the non-negative diagonal matrix representing the scaling filter D. In the diagonal matrix $D^{1/2}$, the square roots of $d_j$ are the diagonal elements.

In the first embodiment of the method 400, the LDL-Cholesky decomposition is performed by (e.g., iteratively)

computing the diagonal elements d(j)=$d_j$ of the scaling filter D and the elements $L_{ldl}$(i, j) of the triangular matrix $L_{ldl}$ according to $$d(j) = \Lambda(j,j) - \sum_{k=0}^{j-1} L_{ldl}(j,k) L_{ldl}^H(j,k) d(k) \quad (4)$$

$$L_{ldl}(i,j) = \frac{\Lambda_{ij} - \sum_{k=0}^{j-1} L_{ldl}(i,k) L_{ldl}^H(j,k) d(k)}{d_j} \text{ for } i \geq j \quad (5)$$

in the first procedure.

In the first embodiment of the method 400, the triangular matrix $L_{ldl}$ is inverted in the step 450 in a second procedure yielding the mixing filter Y:

$$Y = L_{ldl}^{-1}.$$

The triangular matrix $L_{ldl}$ thus functions as an auxiliary matrix variable for the computation of the mixing filter Y.

In a second embodiment of the method 400, a first procedure for the computation of the Cholesky decomposition of the noise covariance matrix $\Lambda$ is based on an auxiliary triangular matrix R. The auxiliary triangular matrix R is different from the conventional triangular matrix $L_{ldl}$ of the conventional LDL-Cholesky decomposition. The elements of the auxiliary triangular matrix R are symbolically related to those of the triangular matrix $L_{ldl}$ of the conventional LDL-Cholesky decomposition according to:

$$R_{ij} = L_{ldl}(i,j) \ast d(j).$$

Substituting above definition of the auxiliary triangular matrix R in the equation (2), an equation for performing the first procedure can be modified as follows:

$$R_{ij} = \Lambda_{ij} - \sum_{k=0}^{j-1} L_{ldl}(i,k) L_{ldl}^H(j,k) d(k) \text{ for } i > j \quad (5')$$

$$R_{ij} = \Lambda_{ij} - \sum_{k=0}^{j-1} \frac{R_{ik}}{d_k} \frac{R_{jk}^H}{d_k} d_k \text{ for } i > j$$

$$R_{ij} = \Lambda_{ij} - \sum_{k=0}^{j-1} \frac{R_{ik} R_{jk}^H}{d_k} \text{ for } i > j.$$

Above equation (5') defines the first procedure according to the second embodiment of the method 400. Advantageously, the equation (5') requires only one division in the addend $$\frac{R_{ij} R_{jk}^H}{d_k},$$

whereas in the first procedure according to equation (5) of the conventional LDL-Cholesky decomposition, each of the terms $L_{ldl}$(i, k) and $L^H_{ldl}$(j, k) have an associated division by $d_k$. Consequently, one division in each term of the sum for the computation of the auxiliary triangular matrix R is avoid as compared to the computation of the triangular matrix $L_{ldl}$ of the conventional LDL-Cholesky decomposition. In at least some implementations of the second method embodiment, the reduced number of divisions avoids the accumulation of error due to the division and/or reduces the computational complexity.

Substituting the definition of the auxiliary triangular matrix R in above equation (4) yields a similar benefit of a reduced number of divisions in the computation of the scaling factors $d_j$ that define the diagonal elements of the scaling filter D:

$$d_j = \Lambda_{jj} - \sum_{k=0}^{j-1} \frac{R_{jk}}{d_k} \frac{R_{jk}^H}{d_k} d_k \text{ for } i = j \quad (4')$$

$$d_j = \Lambda_{jj} - \sum_{k=0}^{j-1} \frac{R_{jk} R_{jk}^H}{d_k} \text{ for } i = j.$$

The scaling filter D is computed in the first procedure of the second method embodiment according to above equation (4').

In the second embodiment of the method 400, the mixing filter Y is symbolically related to the auxiliary triangular matrix R according to:

$$Y = D \cdot R^{-1}.$$

The inversion of the auxiliary triangular matrix R is performed in the step 450 according to the second embodiment of the method 400. As a further advantage, the inversion of the step 450 already includes the factor D, such that no further step of performing the matrix multiplication $D \cdot R^{-1}$ is necessary.

Figure 5:
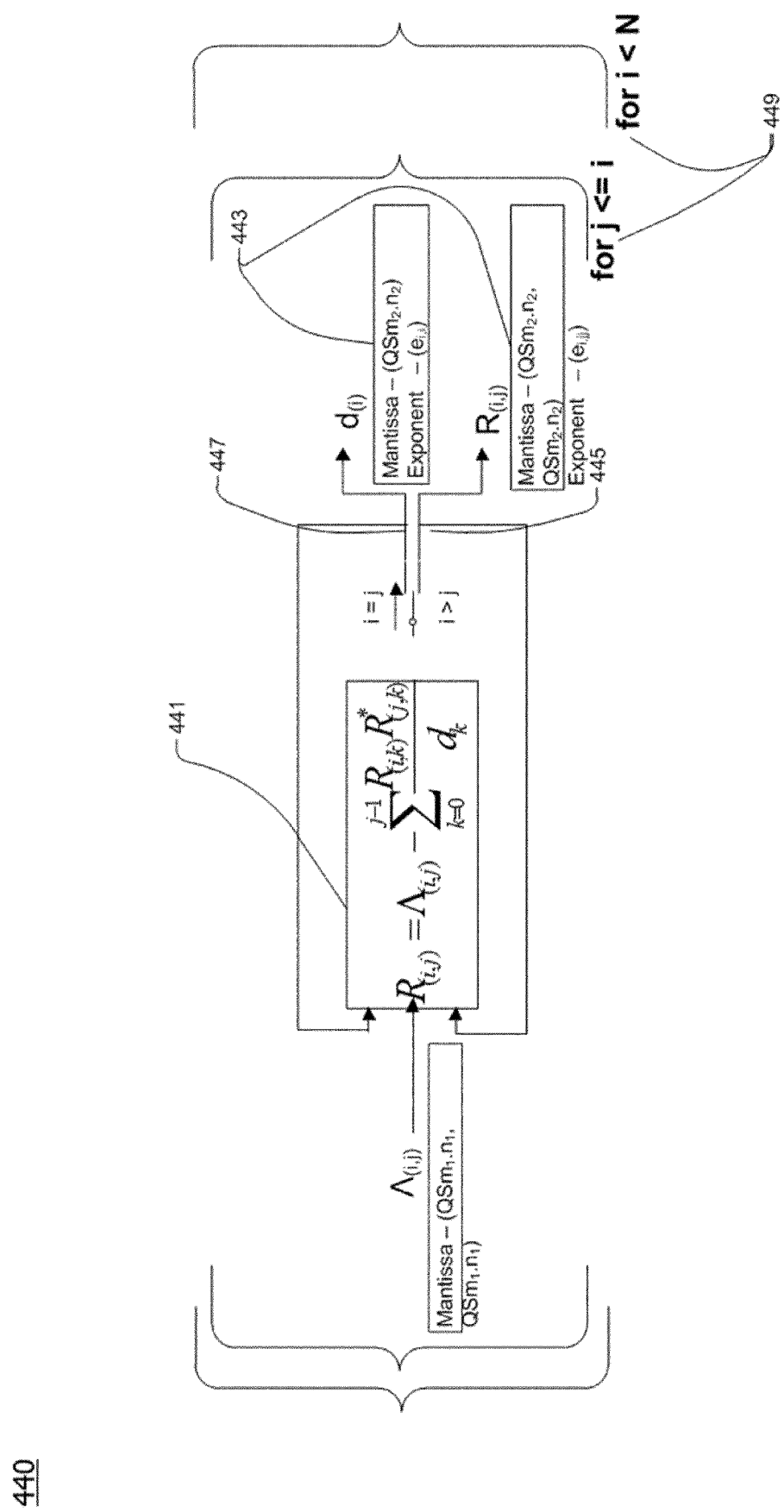
FIG. 5 shows a flow chart of a Cholesky decomposition, which is includable as a part of the method embodiment shown in FIG. 4.

FIG. 5 shows a flowchart of the first procedure for computing the Cholesky decomposition according to the second embodiment. The summation according to the equation (5') is implemented in a inner block 441. The non-zero elements of the auxiliary triangular matrix R are complex. Each of the complex elements is numerically represented by means of a single exponent in the first procedure. Memory units having a corresponding format 443 are indicated in FIG. 5. The auxiliary triangular matrix R is computed according the equation (5'), wherein the summation result is extracted in step 445. The diagonal elements $d_j$ of the scaling filter D are extracted in step 447. As shown in step 449, the first procedure ends after the last diagonal element $d_{N-1} = R_{N-1, N-1}$ has been computed.

Figure 6:
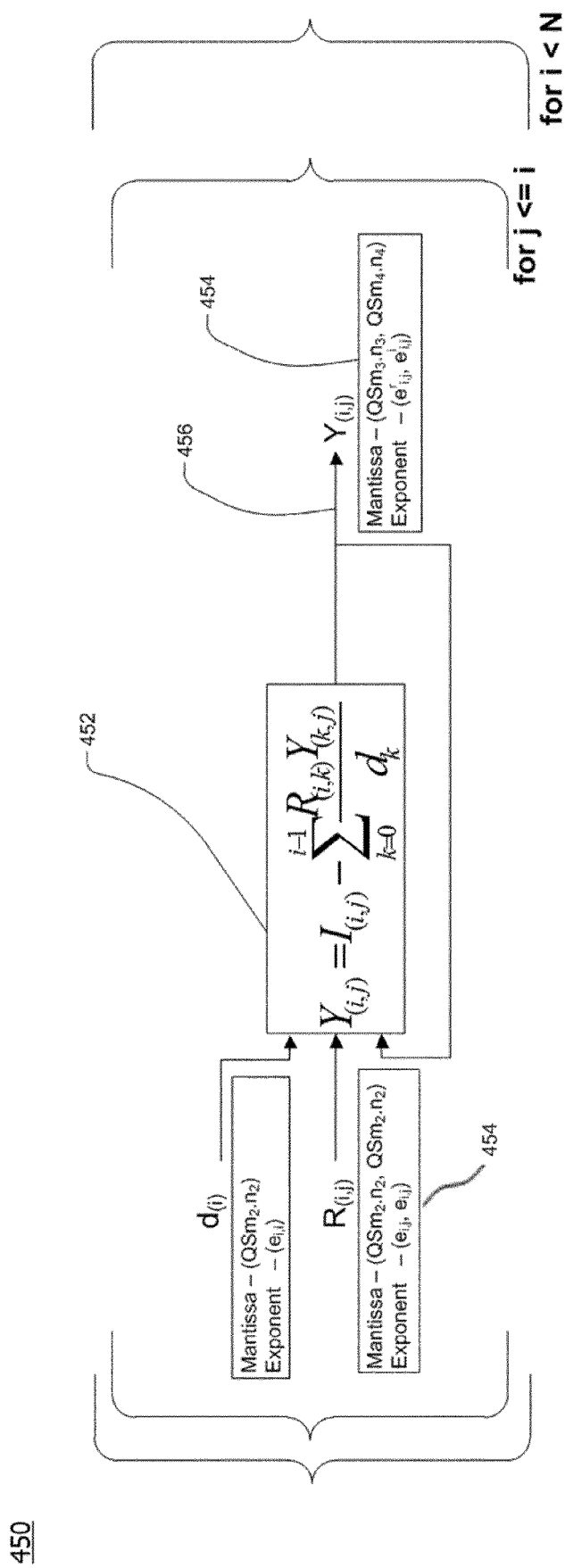
FIG. 6 shows a flow chart of a matrix inversion, which is includable as a part of the method embodiment shown in FIG. 4.

FIG. 6 shows the step 450 of inverting the auxiliary triangular matrix R in order to complete the computation of the mixing filter Y according to the second embodiment of the method 400. The inversion of the auxiliary triangular matrix R according to the step 450 is performed in a second procedure, which is distinct from a conventional matrix inversion of a triangular matrix. A conventional inversion of a triangular matrix is performed according to:

$$X_{(i,j)} = \begin{cases} 0, & i < j \\ \dfrac{I_{(i,j)} - \sum_{k=0}^{i-1} L_{(i,k)} X_{(k,j)}}{L_{(i,i)}}, & i \geq j \end{cases} \quad (6)$$

The output of the Cholesky decomposition in the step 440 according to the second embodiment of the method 400 is the auxiliary triangular matrix R and a vector d of the diagonal elements of the scaling filter D instead of the matrix $L_{ldl}$. The second procedure in the step 450 according to the second embodiment of the method 400 is based on the auxiliary triangular matrix R and the vector d. The step 450 directly yields the mixing filter Y. I.e., the matrix multiplication by the scaling filter D is included in the matrix inversion. The second procedure is performed according to:

$$Y_{(i,j)} = \begin{cases} 0, & i < j \\ I_{(i,j)} - \sum_{k=0}^{i-1} \frac{R_{(i,k)} Y_{(k,j)}}{d_k}, & i \geq j \end{cases} \quad (7)$$

In each of above embodiments, the combined action of the whitening filter F may be symbolized by:

$$F = D^{-1/2} \cdot Y.$$

The combined action of the whitening filter F according to the first embodiment of the method 400 can also be symbolically represented by:

$$F = L^{-1} = D^{-1/2} \cdot L_{ldl}^{-1}.$$

The combined action of the whitening filter F according to the second embodiment of the method 400 can also be symbolically represented by:

$$F = L^{-1} = D^{1/2} \cdot R^{-1}.$$

As a still further advantage achievable with each of above embodiments, the whitening filter F is not applied to the received signals $S_R$ in direct combination of the mixing filter Y and the scaling filter D. Rather, the mixing filter Y is applied at an earlier stage by the pre-processing unit 330. The scaling is performed at a later stage, e.g., in the equalizer 340, based on the combined propagation of the scaling filter D and the pre-processed signals $S_Y$.

FIG. 6 shows a flow chart of an implementation of the step 450 according to the second embodiment. The implementation of the computation of the matrix inversion directly yields the elements of the mixing filter Y in the second procedure according to equation (7). The summation according to the lower right-hand side of equation (7) is implemented by an inner block 452. The diagonal elements $d_k$ have real values. Consequently, the factors $1/d_k$ are numerically represented by a single exponent. The elements $Y_{k,j}$ of the mixing filter Y and the elements of the auxiliary triangular matrix $R_{i,k}$ are complex. Each complex value in the step 450 is numerically represented by means of a first exponent for a real part of the complex value and a separate second exponent for an imaginary part of the complex value. Memory units having a corresponding format 454 are indicated in FIG. 6. The elements $Y_{i,j}$ of the mixing filter Y are extracted in a step 456.

Figure 7:
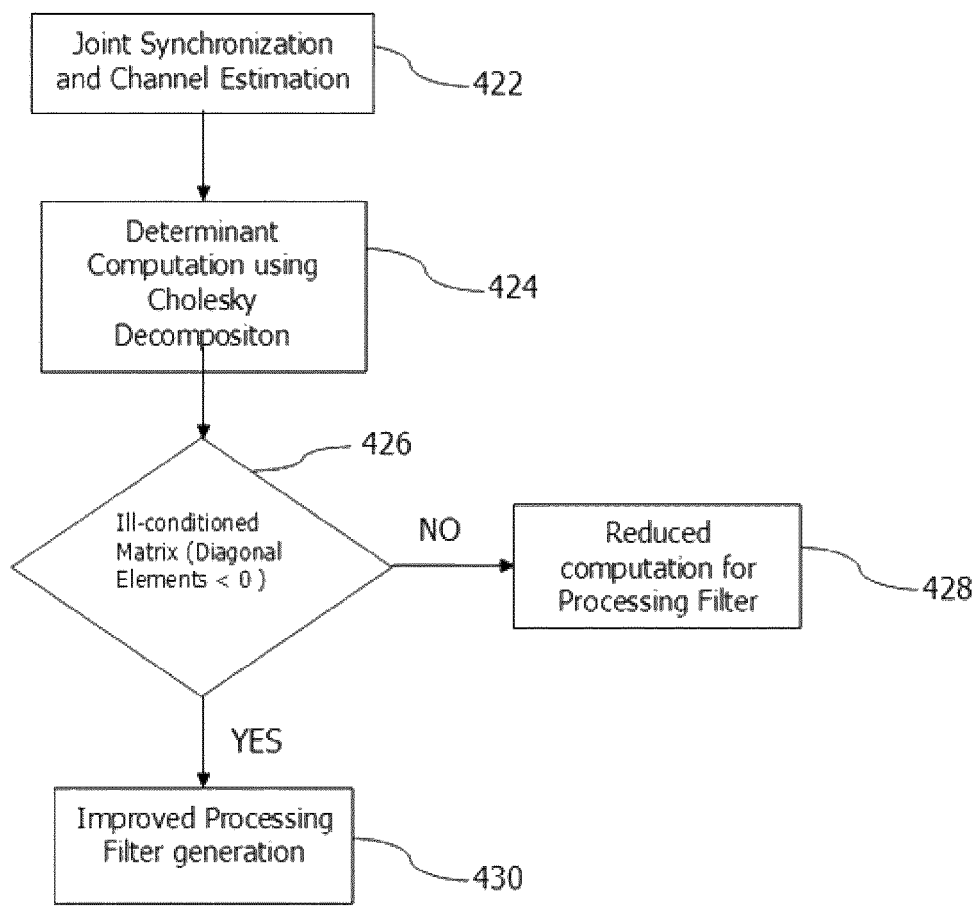
FIG. 7 shows a flow chart of an assessment for detecting an ill-conditioned noise covariance matrix, which is includable as a part of the method embodiment shown in FIG. 4.
Figure 8:
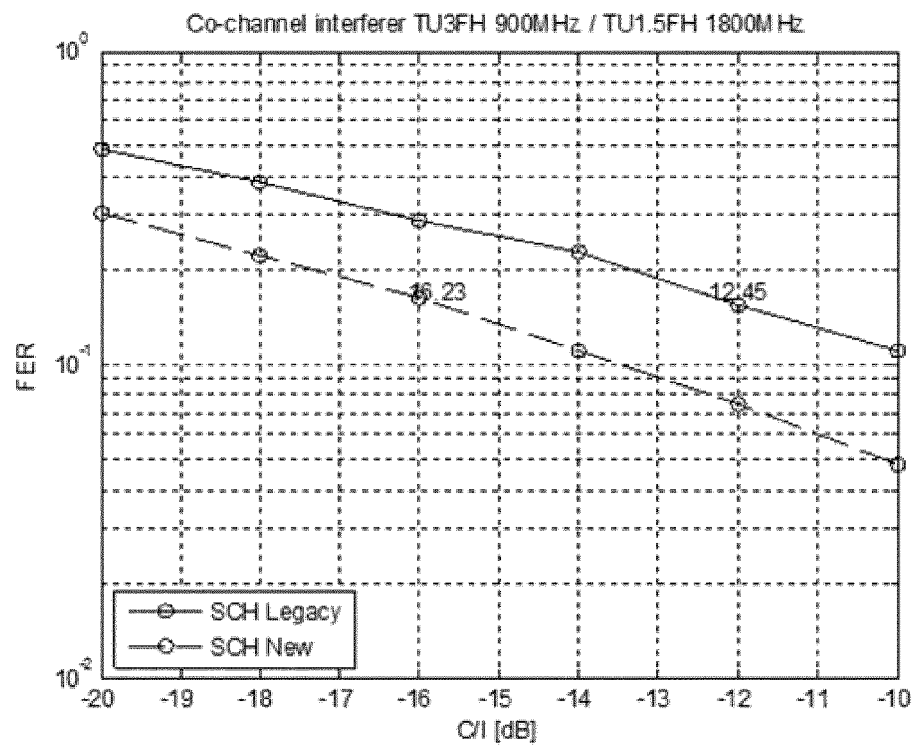
FIGS. 8 to 11 show simulation results for a Frame Error Rate under various channel conditions and in the presence of various sources of noise.
Figure 9:
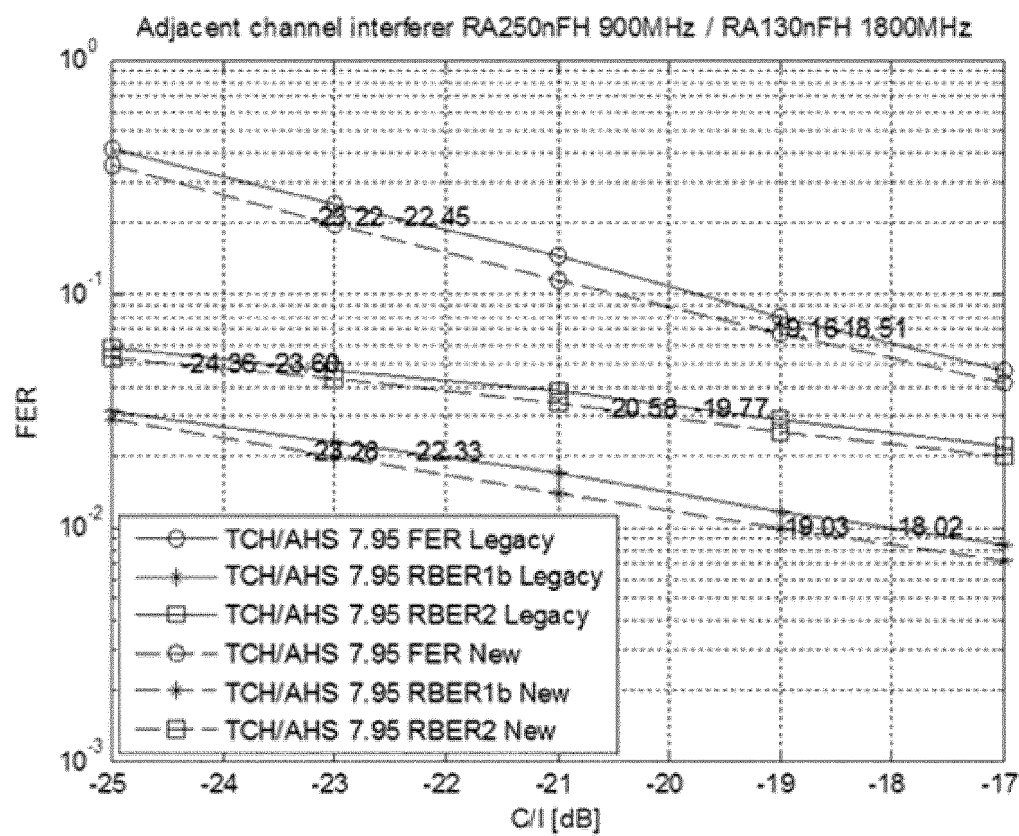
Figure 10:
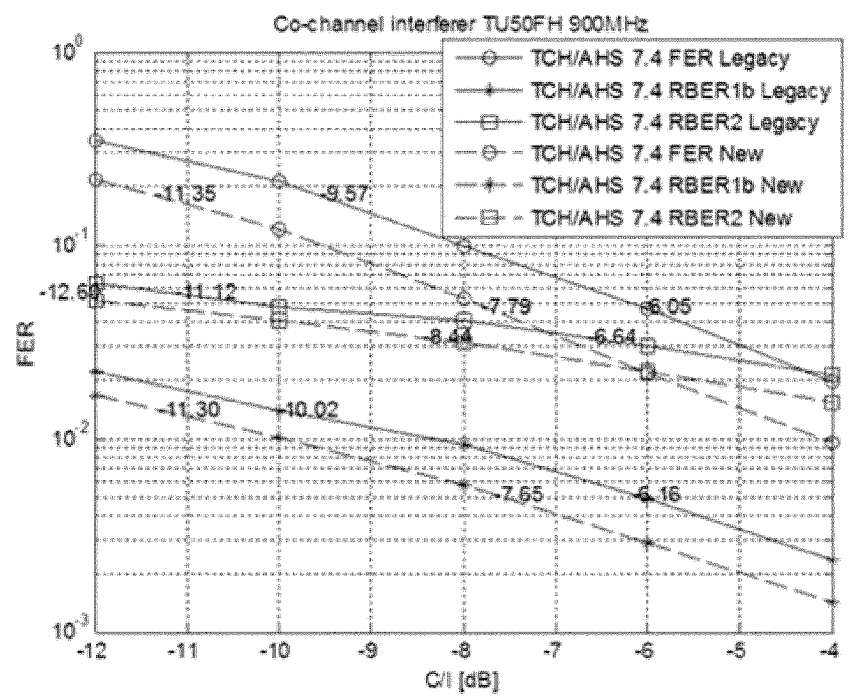
Figure 11:
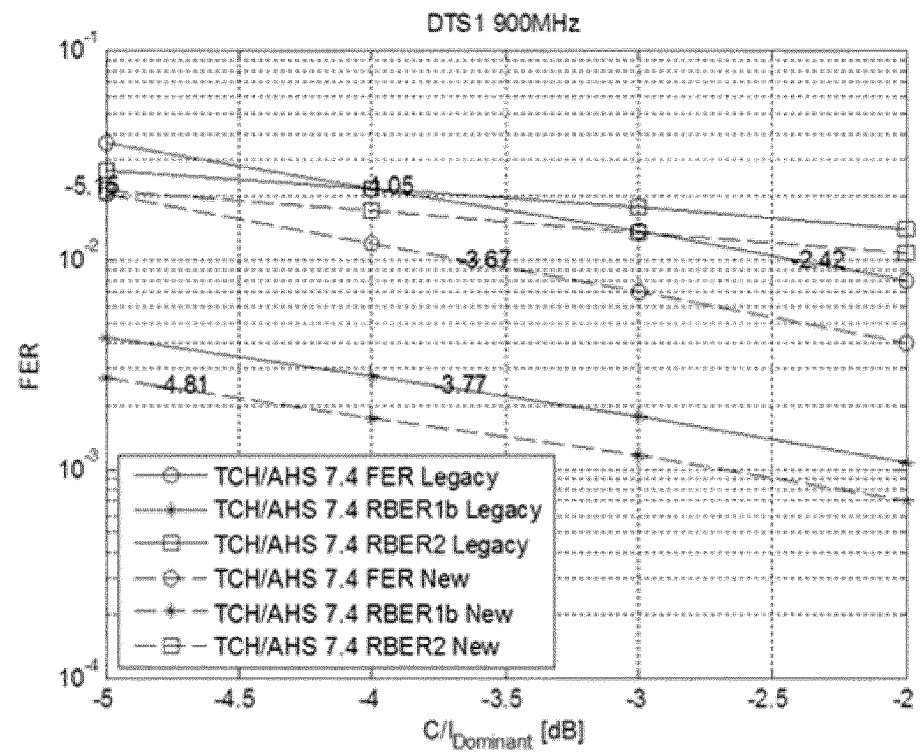

Further details of the step 420 of assessing the condition of the noise covariance $\Lambda$ are described below with reference to FIG. 7. While in the first and second embodiments of the method 400 discussed above, the step 420 of assessing the condition of the noise covariance $\Lambda$ has been described as a separate step distinct from the step 430 of computing the whitening filter F, the step 420 and the step 440 (e.g., as part of the step 430) can be combined in a variant of each of above mentioned embodiments of the method 400. For example, a receiver 300 according to ST-IRC optimizes the synchronization position by minimizing the determinant of the noise covariance matrix $\Lambda$ in a step 422. The determinant of the noise covariance $\Lambda$ is computed in the step 424 using the Cholesky decomposition of the step 440. In the course of computation 424 of the determinant, negative diagonal elements are detected according to step 426.

For example, the Cholesky decomposition of the noise covariance matrix $\Lambda$ is symbolically given by $$\Lambda = L \cdot L^H = (L_{ldl} \cdot D^{1/2}) \cdot (L_{ldl} \cdot D^{1/2})^H$$

in the case of the first embodiment of the method 400, or is symbolically given by $$\Lambda = L \cdot L^H = (R \cdot D^{-1/2}) \cdot (R \cdot D^{-1/2})^H = (Y^{-1} \cdot D^{1/2}) \cdot (Y^{-1} \cdot D^{1/2})^H$$

in the case of the second embodiment of the method 400. The determinant can thus be computed as:

$$\mathrm{Det}(\Lambda) = [\mathrm{Det}(L)]^2$$

or $$\mathrm{Det}(\Lambda) = [\mathrm{Det}(L_{ldl})]^2 \cdot \mathrm{Det}(D)$$

in the case of the first embodiment of the method 400, or as:

$$\mathrm{Det}(\Lambda) = [\mathrm{Det}(L)]^2$$

or $$\mathrm{Det}(\Lambda) = [\mathrm{Det}(R)]^2 / \mathrm{Det}(D)$$

or $$\mathrm{Det}(\Lambda) = \mathrm{Det}(D) / [\mathrm{Det}(Y)]^2$$

in case of the second embodiment of the method 400.

The noise covariance matrix $\Lambda$ corresponding to the optimized synchronization position is also used for computing the whitening filter F in the step 430. The computation of the determinant of the noise covariance matrix $\Lambda$ that optimizes the synchronization position is computed as part of the Cholesky decomposition according to the step 440. The ill-conditioned covariance matrix $\Lambda$ is flagged, if one or more of the diagonal elements $d_i$ become negative. The flag indicating the ill-conditioned noise covariance $\Lambda$ is then used for triggering the computation of the matrix inversion according to the step 450 based on the more involved second numerical representation including separate exponents for real and imaginary parts of each complex value, as is described above. In a variant, the computation of the Cholesky decomposition according to the step 440 is also triggered by the occurrence of negative diagonal elements in a previous conventional Cholesky decomposition that is performed in the separate step 420 of assessing the condition of the noise covariance $\Lambda$ prior to the step 440. In the latter variant, the modified Cholesky decomposition based on the auxiliary triangular matrix R can be employed in order to further improve the receiver performance in the presence of the ill-conditioned noise covariance $\Lambda$. As an option combinable with each variant, a positive value is added to all diagonal elements before computing the Cholesky decomposition in the step 440. The addition gives further performance improvement.

If the noise covariance matrix $\Lambda$, which minimal determinant optimizes the burst synchronization position, is not ill-conditioned (which is also referred to as well-conditioned or robust), a computationally less intensive filter generation 428 is triggered. The reduced computation of the step 428 includes, e.g., a conventional implementation of the filter generation, as described in the document WO 2006/136875 A1. The conventional implementation is sufficient for well-conditioned covariance matrices A that are less susceptible to numerical precision.

The FIGS. 8 to 11 quantitatively indicate the performance improvement in terms of a Frame Error Rate (FER) as a function of a Carrier-to-Interference ration (C/I) based on numerical simulations of various channel conditions. The diagrams in the FIGS. 8 and 10 result from a simulation of a co-channel interference as the source of the noise. The diagram shown in the FIG. 9 results from a simulation of an adjacent channel interfere as the source of the noise. Scenarios that are "Typical Urban" include the abbreviation "TU". Scenarios with "Frequency Hopping" include the abbreviation "FH", and those that have "no Frequency Hopping" include the abbreviation "nFH". The abbreviation DTS stands for DARP Test Scenario.

The legend in each of the diagrams shown in FIGS. 8 to 11 indicates the investigated channel state H in conjunction with the channel rate using the abbreviations:
SCH: Synchronization Channel
TCH: Traffic Channel
FS: Full Rate speech
AFS: AMR Full Rate speech
AHS: AMR Half Rate speech.

The performance improvement in decibel (dB) is summarized in below table:

|  | C1 | C2 | C4 | A1 | A2 | A3 | A4 | A5 | Z1 |
|---|---|---|---|---|---|---|---|---|---|
| SCH | 3.71 | 3.78 |  |  |  |  |  |  |  |
| TCH/FS | 1.91 | 1.65 | 1.51 | 0.86 | 0.78 |  |  |  | 0.97 |
| TCH/AFS 5.9 | 2.02 |  |  |  | 0.88 |  |  |  |  |
| TCH/AHS 7.95 |  | 1.8 |  | 1.03 |  |  |  | 1.03 |  |
| TCH/AHS 7.4 |  |  | 1.61 |  |  | 0.82 | 0.83 |  | 1.25 |
| TCH/AHS 4.75 |  |  |  |  |  |  |  |  | 1.1 | wherein the columns relate to the following scenarios:
C1: Co-channel Interferer; Typical Urban, 3 kmph; No Frequency Hopping
C2: Co-channel Interferer; Typical Urban, 3 kmph; Frequency Hopping
C4: Co-channel Interferer; Typical Urban, 50 kmph; Frequency Hopping
A1: Adjacent 200 kHz Interferer; Typical Urban, 3 kmph; No Frequency Hopping
A2: Adjacent 200 kHz Interferer; Typical Urban, 3 kmph; Frequency Hopping
A3: Adjacent 200 kHz Interferer; Typical Urban, 50 kmph; No Frequency Hopping
A4: Adjacent 200 kHz Interferer; Typical Urban, 50 kmph; Frequency Hopping
A5: Adjacent 200 kHz Interferer; Rural Area, 250 kmph; No Frequency Hopping
Z1: DTS-1; Co-channel 1; no delay.

As has become apparent from above description of embodiments, the present disclosure provides a technique for generating a whitening filter that can be implemented at low hardware requirements and that can lead to improvements in receiver performance. Performance simulations have indicated a gain of 2 dB and more for the propagating channels defined by 3GPP. Such a gain is specifically significant since a phone call communicated by means of the mobile communication network can sustain at higher interference levels as compared to existing mobile communication networks. The improved receiver performance may be necessary in many situations to comply with stricter performance requirements that are being standardized for additional GSM features, such as Voice Services Over Adaptive Multi-User Orthogonal Sub Channels (VAMOS). In at least some of the embodiments, performance improvement is obtained with the least computational complexity possible. For example, a receiver according to ST-IRC includes a computational intensive algorithm and with the introduction of above-mentioned additional GSM features, such as VAMOS, the computational complexity is further increased, since the ST-IRC algorithm is called multiple times for VAMOS. Under these circumstances, the above computationally optimized technique provides a manifold reduction of computational complexity for the DSPs of the ST-IRC receiver.

The detecting of ill-conditioned noise covariance matrices can be used to improve the performance even further due to a pre-processing only on the ill-conditioned noise covariance matrices, so that the Cholesky decomposition performance is improved. The determining of ill-conditioned noise covariance matrices can also be used to reduce the required processor speed. For the well-conditioned matrices, a computationally less intensive procedure can be performed for computing the whitening filter, since a numerical loss is low for the well-conditioned matrices.

The combination of the first procedure that computes the Cholesky decomposition using a single exponent for one complex value and the second procedure that computes the matrix inversion using two separate exponents for the real part and the imaginary part of one complex value may yield an optimal balance between computational complexity and numerical precision in at least some embodiments. Furthermore, a half precision floating-point format, which is also referred to as "binary16", has been observed to be sufficient for achieving performance improvements.

The technique described herein is also applicable for any other generation of a filter that is based on the inverse of a Cholesky decomposition of a positive-definite matrix. The disclosure is not limited to an ST-IRC receiver and is not even limited to be based on a noise covariance matrix, but is applicable to any positive-definite matrix.

It will be appreciated by those skilled in the art that the embodiments described above may be adapted or extended various ways. Accordingly, the scope of the invention is defined only be the claims that follow and the elements recited therein.

The invention claimed is:
1. A method of generating a processing filter for processing data received in a mobile communication network on multiple branches, the method comprising:
   determining a covariance ($\Lambda$) of noise on the multiple branches; and
   computing the processing filter based on the noise covariance ($\Lambda$), wherein the computation includes a Cholesky decomposition of the noise covariance ($\Lambda$) and a matrix inversion based on a result of the Cholesky decomposition, wherein the Cholesky decomposition uses a first numerical representation and the matrix inversion uses a second numerical representation,
   wherein the first numerical representation includes a complex value with one exponent common for both a real part and an imaginary part of the complex value; and
   wherein the second numerical representation includes a complex value with a first exponent for a real part of the complex value and a second exponent for an imaginary part of the complex value.
2. The method of claim 1, wherein the processing filter includes a mixing filter adapted to mix signals received on the multiple branches.
3. The method of claim 2, wherein the mixing filter is configured to compensate a correlation between the noise on the multiple branches.

4. The method of claim 1, wherein the processing filter includes a scaling filter adapted to scale individual signals.

5. The method of claim 4, wherein the scaling filter is configured to equalize a variance of the noise.

6. The method of claim 1, wherein the data is received on different branches of the multiple branch receiver separate in at least one of space and time.

7. The method of claim 1, wherein the data is oversampled on each or some of the multiple branches.

8. The method of claim 1, wherein the Cholesky decomposition is computed by means of a first procedure.

9. The method of claim 8, wherein the first procedure relates to at least one of:

the computation of the mixing filter based on a lower triangular matrix (R) according to $$R_{(i,j)} = \Lambda(i,j) - \sum_{k=0}^{j-1} \frac{R_{(i,k)} R^*_{(j,k)}}{d_k} \text{ for } i > j;$$

and
the computation of the scaling filter according to $$d_i = \Lambda(i,j) - \sum_{k=0}^{i-1} \frac{R_{(i,k)} R^*_{(i,k)}}{d_k},$$

wherein the scaling filter is represented by a diagonal matrix, and wherein $d_i$ is a diagonal element of the diagonal matrix.

10. The method of claim 9, wherein the computation of the mixing filter includes the matrix inversion of the lower triangular matrix (R).

11. The method of claim 10, wherein the lower triangular matrix (R) is inverted in a second procedure according to $$Y_{(i,j)} = \begin{cases} 0, & i < j \\ I_{(i,j)} - \sum_{k=0}^{i-1} \frac{R_{(i,k)} Y_{(k,j)}}{d_k}, & i \geq j \end{cases}$$

wherein I is the Identity Matrix, and wherein $Y_{(i,j)}$ is a matrix representation of the mixing filter.

12. The method of claim 1, wherein the processing filter is applied to the received data in a sequence of operations in accordance with at least one of $F = D^{-1/2} \cdot R^{-1}$, wherein the lower triangular matrix may be denoted by $R$; and $F = D^{-1/2} \cdot Y$, wherein the mixing filter may be denoted by $Y$, wherein the processing filter is represented by F and the scaling filter is represented by a diagonal matrix D.

13. The method of claim 1, further comprising:
pre-processing signals of the received data according to the mixing filter.

14. The method of claim 13, further comprising:
providing the scaling filter to one or more units that process at least one of the pre-processed signals and a pre-processed channel estimate.

15. The method of claim 1, further comprising the step of determining a channel estimate, wherein the channel estimate is transformed into the pre-processed channel estimate using the mixing filter or into a processed channel estimate using the processing filter.

16. The method of claim 1, further comprising:
assessing a condition of the noise covariance ($\Lambda$),
wherein at least a part of the computation is performed in response to the assessment indicating an ill-conditioned covariance.

17. The method of claim 16, wherein the ill-conditioned covariance is indicated by zero or negative diagonal elements in the Cholesky decomposition.

18. A non-transitory computer-readable medium comprising program code portions for performing the steps of a method of generating a processing filter for processing data received in a mobile communication network on multiple branches when the program code portions are executed by a computing device, wherein the method comprises:
determining a covariance ($\Lambda$) of noise on the multiple branches; and
computing the processing filter based on the noise covariance ($\Lambda$), wherein the computation includes a Cholesky decomposition of the noise covariance ($\Lambda$) and a matrix inversion based on a result of the Cholesky decomposition, wherein the Cholesky decomposition uses a first numerical representation and the matrix inversion uses a second numerical representation,
wherein the first numerical representation includes a complex value with one exponent common for both a real part and an imaginary part of the complex value; and
wherein the second numerical representation includes a complex value with a first exponent for a real part of the complex value and a second exponent for an imaginary part of the complex value.

19. A device for generating a processing filter for processing data received in a mobile communication network on multiple branches, the device comprising:
a determining unit adapted to determine a covariance ($\Lambda$) of noise on the multiple branches; and
a computing unit adapted to compute the processing filter based on the noise covariance ($\Lambda$), wherein the computation includes a Cholesky decomposition of the noise covariance ($\Lambda$) and a matrix inversion based on a result of the Cholesky decomposition, wherein the Cholesky decomposition uses a first numerical representation and the matrix inversion uses a second numerical representation,
wherein the first numerical representation includes a complex value with one exponent common for both a real part and an imaginary part of the complex value; and
wherein the second numerical representation includes a complex value with a first exponent for a real part of the complex value and a second exponent for an imaginary part of the complex value.

20. The device of claim 19, further comprising at least one of:
a pre-processing unit adapted to pre-process signals of the received data according to a mixing filter included in the processing filter; and
an equalizing unit adapted to scale the pre-processed signals according to a scaling filter included in the processing filter.

* * * * *